(Model.)

A. STOLER.
Fertilizer Sower.

No. 235,714. Patented Dec. 21, 1880.

WITNESSES:
S. J. VanStavoren
W. Connolly

INVENTOR
Abraham Stoler,
By Connolly Bros,
ATTORNEYS.

United States Patent Office.

ABRAHAM STOLER, OF PHILADELPHIA, PENNSYLVANIA.

FERTILIZER-SOWER.

SPECIFICATION forming part of Letters Patent No. 235,714, dated December 21, 1880.

Application filed March 1, 1880. (Model.)

*To all whom it may concern:*

Be it known that I, ABRAHAM STOLER, of Philadelphia, in the county of Philadelphia, State of Pennsylvania, have invented certain new and useful Improvements in Fertilizer-Sowers; and I do hereby declare the following is a full, clear, and exact description of the same, reference being had to the annexed drawings, forming part of this specification, wherein—

Figure 1:
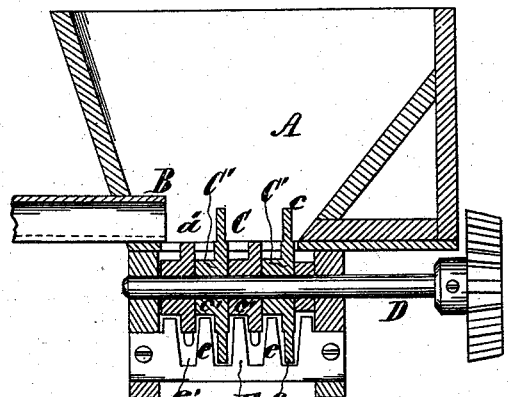
Figure 2:
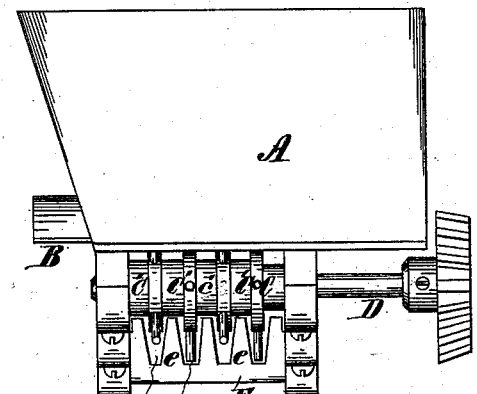
Figure 3:
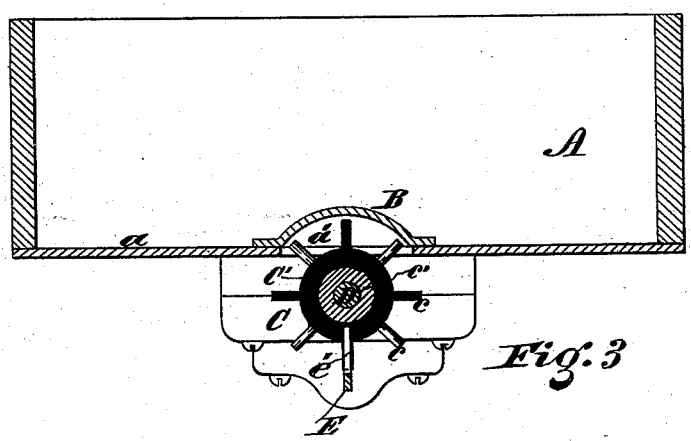

Figure 1 is a vertical transverse section of my invention; Fig. 2, a side elevation, and Fig. 3 is a longitudinal vertical section, of the same.

My invention has for its object to provide means whereby fertilizers, such as guano, &c., may be fed with regularity and certainty from a hopper, so as to be sown or distributed uniformly over the ground or together with seed.

My improvements relate to means for feeding such fertilizers; and they consist in the combination, with a hopper having a discharge-opening in its bottom, of an exposed feed-wheel located below such bottom, and a comb or cleaner below such wheel and in perpendicular line with the shaft thereof, the teeth of such wheel projecting through such bottom opening and passing through the interstices of the cleaner.

Referring to the annexed drawings, A indicates a hopper of ordinary construction, designed to be mounted on a frame and wheels to constitute a machine, or to be placed on the frame of a seeding-machine. The bottom $a$ of such hopper is designed to be formed with a series of openings, such as shown at $a'$, each of said openings having a cut-off or slide, B, whereby it may be closed or its extent graduated. Beneath each opening $a'$ (and therefore below the bottom of the hopper) is a feed-wheel, C, having teeth $c$, which project and work through said openings. These wheels are each composed of a series of sections or rings, C', having the teeth $c$ and hubs $c'$, mounted on shafts D. The rings C' are so arranged that the teeth $c$ alternate or break ranks, as shown. Below the feed-wheels C, and in line with the shafts D, are combs or cleaners E, having teeth $e$, with interstices $e'$, through which latter the teeth of the feed-wheels pass. Said combs operate to clean the feed-wheels and to detach therefrom any adhering portions of fertilizers.

The operation is as follows: Motion being communicated to the feed-wheels in any suitable manner, (as by gear-connection with the supporting-wheels of the machine,) the fertilizer in the hopper is drawn down through the openings $a'$ in the bottom of said hopper by the action of the teeth of said feed-wheels, the latter being cleared or stripped of any adhering material, when they reach the perpendicular, by the combs E, the fertilizer so fed falling to the ground, or passing thereto through the fluke or spout of a seeding-machine, if used in connection with the latter.

What I claim as my invention is—

The combination, with a fertilizer-hopper, A, having an opening, $a'$, in its bottom, of an exposed feed-wheel located below such bottom and having its teeth project through such opening, and a comb or cleaner located below such wheel and in perpendicular line with the shaft of said wheel, the teeth of the latter being adapted to pass through the interstices of the comb when they assume a vertical position, substantially as set forth.

In testimony that I claim the foregoing I have hereunto set my hand this 27th day of February, 1880.

ABRAHAM STOLER.

Witnesses:
 AL. P. BURCHELL,
 S. J. VAN STAVOREN.